US011651193B2

(12) United States Patent
Marukame et al.

(10) Patent No.: US 11,651,193 B2
(45) Date of Patent: May 16, 2023

(54) OPERATION APPARATUS

(71) Applicant: KABUSHIKI KAISHA TOSHIBA, Minato-ku (JP)

(72) Inventors: Takao Marukame, Chuo (JP); Yoshifumi Nishi, Yokohama (JP); Kumiko Nomura, Shinagawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 877 days.

(21) Appl. No.: 16/555,430

(22) Filed: Aug. 29, 2019

(65) Prior Publication Data

US 2020/0293861 A1 Sep. 17, 2020

(30) Foreign Application Priority Data

Mar. 15, 2019 (JP) .............................. JP2019-049035

(51) Int. Cl.
*G06N 3/045* (2023.01)
*G06F 17/16* (2006.01)
(Continued)

(52) U.S. Cl.
CPC ............. *G06N 3/045* (2023.01); *G06F 17/16* (2013.01); *G06N 3/084* (2013.01); *G06N 20/00* (2019.01)

(58) Field of Classification Search
CPC ...... G06N 3/0454; G06N 3/084; G06N 3/063; G06N 3/088; G06N 3/0445; G06N 3/08;
(Continued)

(56) References Cited

U.S. PATENT DOCUMENTS 10,175,947 B1 1/2019 Marukame et al.
10,819,718 B2 * 10/2020 David .................... G06N 3/044
(Continued)

FOREIGN PATENT DOCUMENTS

JP 1993090501 * 7/1994 ............... G10L 9/00
JP 2019-53563 A 4/2019

OTHER PUBLICATIONS

Hirotaka Kubo, et al., "Construction of the neural network in imitation of BP learning algorithm", Information Processing Society 66th National Convention, 2004, 8 pages (with English Translation).
(Continued)

*Primary Examiner* — Linda Wong
(74) *Attorney, Agent, or Firm* — Oblon, McClelland, Maier & Neustadt, L.L.P.

(57) ABSTRACT

According to an embodiment, an operation apparatus includes a first neural network, a second neural network, an evaluation circuit, and a coefficient-updating circuit. The first neural network performs an operation in a first mode. The second neural network performs an operation in a second mode and has a same layer structure as the first neural network. The evaluation circuit evaluates an error of the operation of the first neural network in the first mode and evaluates an error of the operation of the second neural network in the second mode. The coefficient-updating circuit updates, in the first mode, coefficients set for the second neural network based on an evaluating result of the error of the operation of the first neural network, and updates, in the second mode, coefficients set for the first neural network based on an evaluating result of the error of the operation of the second neural network.

18 Claims, 10 Drawing Sheets

(51) Int. Cl.
*G06N 3/084* (2023.01)
*G06N 20/00* (2019.01)

(58) Field of Classification Search
CPC .......... G06N 20/00; G06N 3/02; G06N 7/005; G06N 7/046; G06N 3/0481; G06F 17/16
See application file for complete search history.

(56) References Cited

U.S. PATENT DOCUMENTS

| | | |
|---|---|---|
| 2015/0088797 A1 | 3/2015 | Kim et al. |
| 2018/0068218 A1* | 3/2018 | Yoo .................. G06V 10/82 |
| 2019/0156203 A1* | 5/2019 | Kang .................. G06N 3/0445 |

OTHER PUBLICATIONS

S.R. Nandakumar, et al., "Mixed-precision architecture based on computational memory for training deep neural networks", IEEE International Symposium on Circuits and Systems (ISCAS), May 2018, 6 pages.

G.W. Burr, et al., "Experimental demonstration and tolerancing of a large-scale neural network (165,000 synapses), using phase-change memory as the synaptic weight element", IBM, IEEE, 2014, 4 pages.

T.P. Lillicrap, et al., "Random synaptic feedback weights support error backpropagation for deep learning", Nature Communications 7: 13276, Nov. 8, 2016, 10 pages.

\* cited by examiner

OPERATION APPARATUS

CROSS-REFERENCE TO RELATED APPLICATIONS

This application is based upon and claims the benefit of priority from Japanese Patent Application No. 2019-049035 filed on Mar. 15, 2019, the entire contents of which are incorporated herein by reference.

FIELD

Embodiments described herein relate generally to operation apparatuses.

BACKGROUND

There has been developed a technique for implementing a neuromorphic processor using a hardware-implemented neural network. In such a neuromorphic processor, a learning tool provides error data for a neural network to optimize weighting coefficients and other parameters set for the neural network.

The conventional neural network performs a learning process and optimizes weighting coefficients with its normal operation process halted. This allows the conventional neural network to perform the learning process with an external processor.

However, implementing the neuromorphic processor involves the neural network performing the operation process and the learning process in parallel. This configuration requires the neural network to perform, in parallel, a process of propagating target data to be operated, which is received from an external device, in a forward direction and a process of propagating error data for learning in a backward direction.

DETAILED DESCRIPTION

According to an embodiment, an operation apparatus includes a first neural network, a second neural network, an evaluation circuit, and a coefficient-updating circuit. The first neural network is configured to perform an operation in a first mode, the first neural network being implemented with a hardware circuit. The second neural network is configured to perform an operation in a second mode differing from the first mode, the second neural network being implemented with a hardware circuit and having a same layer structure as a layer structure of the first neural network. The evaluation circuit is configured to evaluate an error of the operation performed by the first neural network in the first mode and evaluate an error of the operation performed by the second neural network in the second mode. The coefficient-updating circuit is configured to update, in the first mode, a plurality of coefficients set for the second neural network based on an evaluating result of the error of the operation of the first neural network, and update, in the second mode, a plurality of coefficients set for the first neural network based on an evaluating result of the error of the operation of the second neural network.

An operation apparatus 10 according to an embodiment will now be described with reference to the accompanying drawings. The operation apparatus 10 according to the embodiment is capable of performing an operation process and a learning process in parallel in a neural network.

Figure 1:
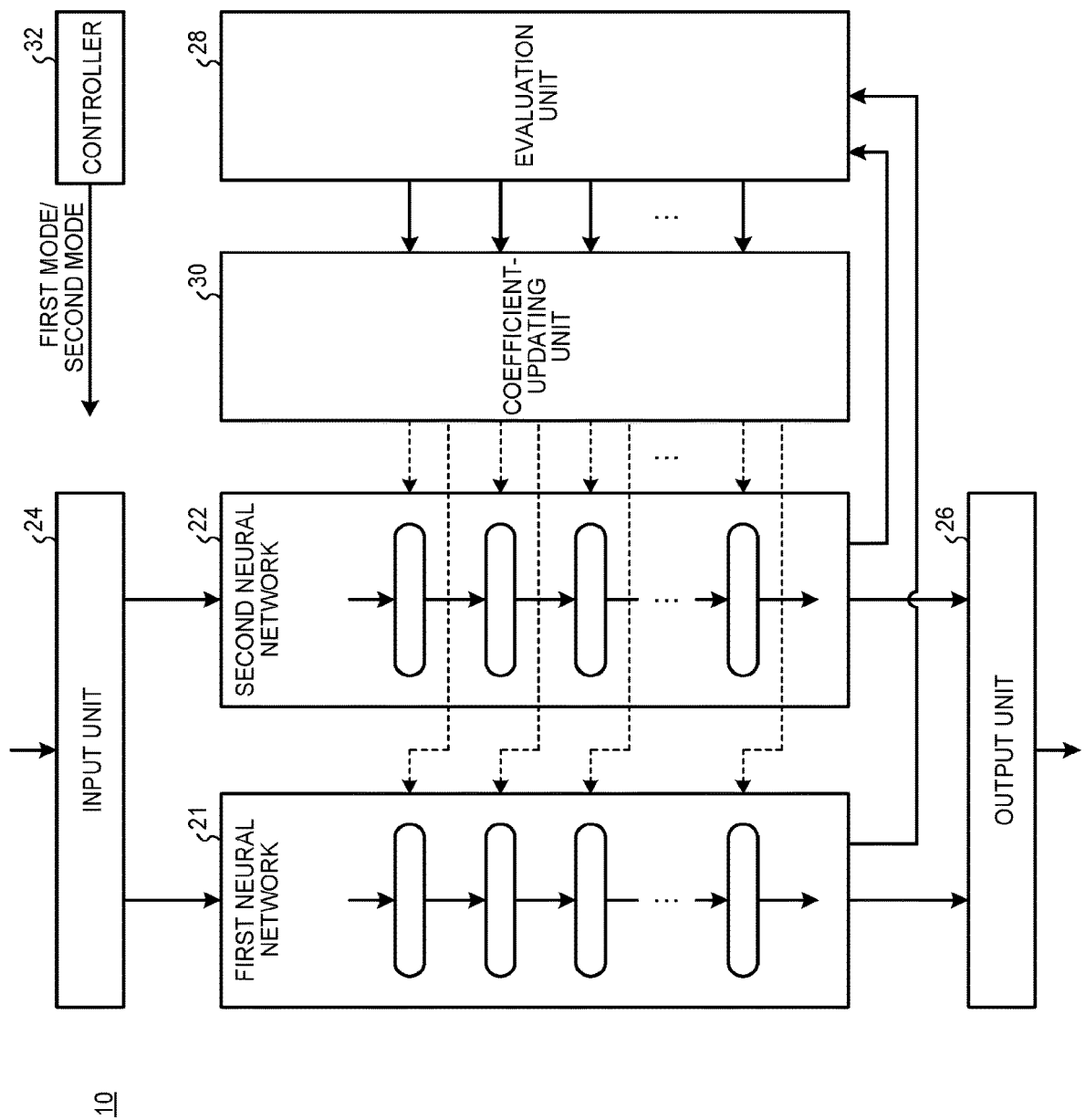
FIG. 1 is a structural diagram of an operation apparatus according to an embodiment.

FIG. 1 is a diagram illustrating the configuration of the operation apparatus 10 according to the embodiment. The operation apparatus 10 is hardware implemented on, for example, a semiconductor chip. The operation apparatus 10 may be a circuit formed on a substrate. The operation apparatus 10 may be a circuit formed on a plurality of semiconductor chips or a plurality of substrates.

The operation apparatus 10 includes a first neural network 21, a second neural network 22, an input unit (an input circuit) 24, an output unit (an output circuit) 26, an evaluation unit (an evaluation circuit) 28, a coefficient-updating unit (a coefficient-updating circuit) 30, and a controller (a control circuit) 32.

The first neural network 21 is implemented with a hardware circuit. In the first neural network 21, a plurality of coefficients set for each of a plurality of layers may be variable resistor elements used for resistive random access memories (ReRAMs), or may be variable capacitors, for example.

The second neural network 22 is implemented with a hardware circuit. The second neural network 22 has the same layer structure as that of the first neural network 21. The number of layers, the number of values input to and output from each layer, a matrix-multiplication circuit in each layer, and an activation function circuit in each layer of the first neural network 21 are the same as those of the second neural network 22. The values of the coefficients set for the first neural network 21 and the second neural network 22 may be different from each other.

The first neural network 21 and the second neural network 22 have N (N is an integer of 2 or more) layers each. The first neural network 21 and the second neural network 22 individually output a plurality of intermediate output values from each of the N layers.

The action of the operation apparatus 10 is switched between a first mode and a second mode. The first neural network 21 performs an operation in the first mode, and does not perform any operation in the second mode. In contrast, the second neural network 22 performs an operation in the second mode, and does not perform any operation in the first mode.

Coefficients set in the first neural network 21 are updated in the second mode, and are not updated in the first mode. In contrast, coefficients set in the second neural network 21 are updated in the first mode, are not updated in the second mode.

The input unit 24 receives a plurality of input values to be operated from another device. In the first mode, the input unit 24 provides the input values for the initial layer (first layer) of the first neural network 21. In the second mode, the input unit 24 provides the input values for the initial layer (first layer) of the second neural network 22.

In the first mode, the output unit 26 outputs, as output values, the intermediate output values output from the final layer (N-th layer) of the first neural network 21 to another device. In the second mode, the output unit 26 outputs, as output values, the intermediate output values output from the final layer (N-th layer) of the second neural network 22 to another device.

In the first mode, the evaluation unit 28 evaluates an error of the operation by the first neural network 21. In the second mode, the evaluation unit 28 evaluates an error of the operation by the second neural network 22.

For example, the evaluation unit 28 generates, in the first mode, a plurality of intermediate evaluation values correspondingly to each of the N layers of the second neural network 22. The plurality of intermediate evaluation values to be generated, which correspond to each of the N layers of the second neural network 22, are values obtained by evaluating the plurality of intermediate output values output from the corresponding layer of the N layers in the first neural network 21. The evaluation unit 28 generates, in the second mode, a plurality of intermediate evaluation values correspondingly to each of the N layers of the first neural network 21. The plurality of intermediate evaluation values to be generated, which correspond to each of the N layers of the first neural network 21, are values obtained by evaluating the plurality of intermediate output values output from the corresponding layer of the N layers in the second neural network 22.

The evaluation unit 28 may be implemented with a hardware circuit, or may be implemented by a processor executing a computer program. The details of the evaluation unit 28 will be further described later.

In the first mode, the coefficient-updating unit 30 updates the coefficients set for the second neural network 22, based on the evaluation result of evaluating the error of the operation by the first neural network 21. In the second mode, the coefficient-updating unit updates the coefficients set for the first neural network 21, based on the evaluation result of evaluating the error of the operation by the second neural network 22.

Specifically, the coefficient-updating unit 30 updates, in the first mode, the coefficients set for each of the N layers of the second neural network 22, based on the intermediate evaluation values corresponding to each of the N layers of the first neural network 21.

Similarly, in the second mode, the coefficient-updating unit 30 updates the coefficients set for each of the N layers of the first neural network 21, based on the intermediate evaluation values corresponding to each of the N layers of the second neural network 22.

For example, the coefficient-updating unit 30 calculates gradients of the errors of the coefficients for each of the N layers. The coefficient-updating unit 30 changes the coefficients in a direction where the gradients of the errors of the coefficients become zeros.

The coefficient-updating unit 30 may be implemented with a hardware circuit, or may be implemented by a processor executing a computer program. The details of the coefficient-updating unit 30 will be further described later.

The controller 32 switches between the first mode and the second mode alternately. The controller 32 may switch the mode, for example, for a certain period of time. The controller 32 may switch the mode each time when it receives an input value predetermined times.

Figure 2:
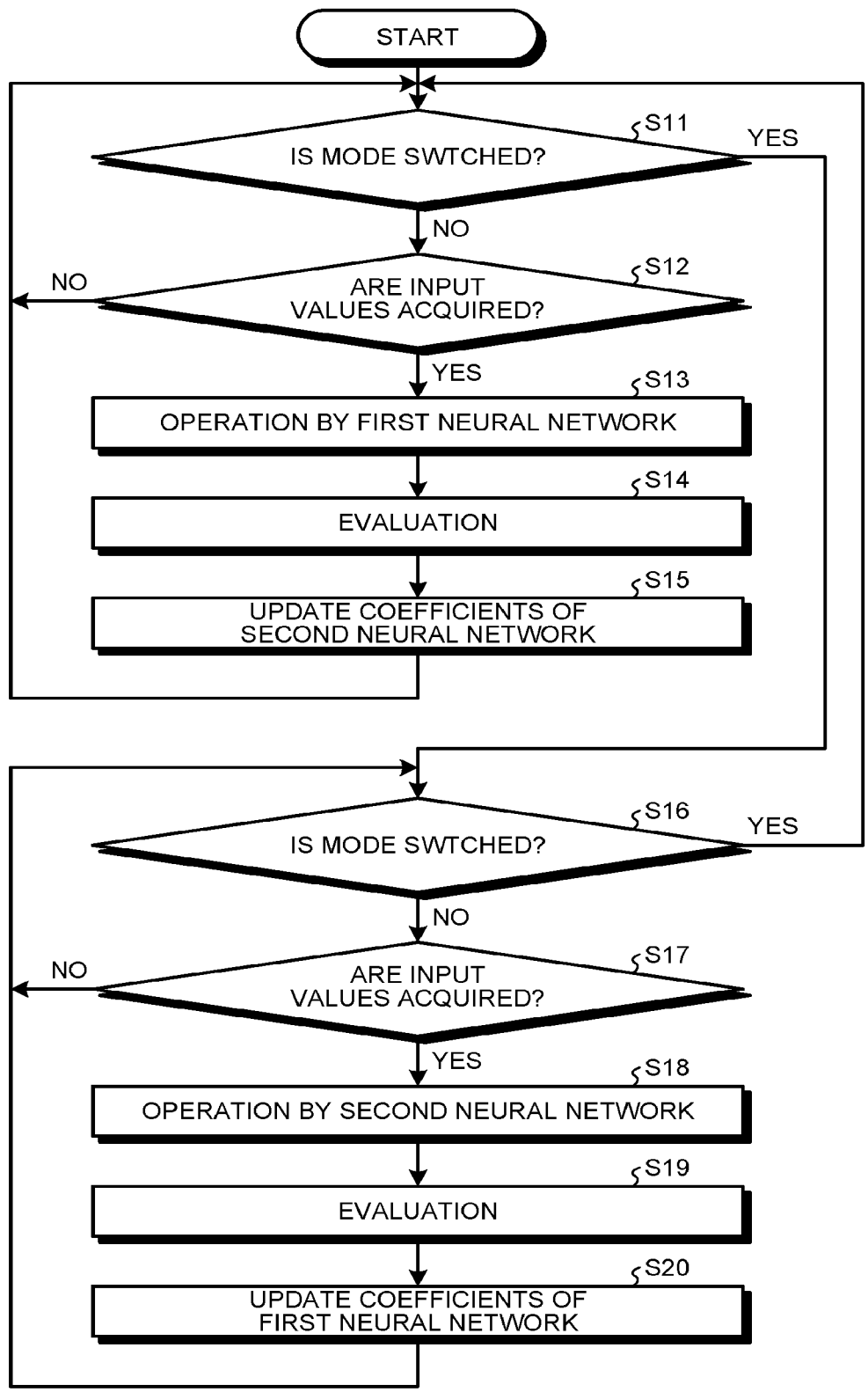
FIG. 2 is a flowchart illustrating a flow of a process by the operation apparatus.

FIG. 2 is a flowchart illustrating a flow of a process by the operation apparatus 10. At S11, it is assumed that the operation apparatus 10 is set to the first mode.

At S11, the operation apparatus 10 determines whether the mode is switched. That is, the operation apparatus 10 determines whether it is switched to the second mode.

When the mode is not switched (No at S11), the operation apparatus 10 determines, at S12, whether a plurality of input values is acquired. When no input values are acquired (No at S12), the operation apparatus 10 returns the process to S11. When the input values are acquired (Yes at S12), the operation apparatus 10 advances the process to S13. When the mode is switched (Yes at S11), the operation apparatus 10 advances the process to S16.

At S13, the operation apparatus 10 performs the operation on the acquired input values by the first neural network 21. As a result, the operation apparatus 10 can output a plurality of output values. At S14, the operation apparatus 10 evaluates an error of the operation by the first neural network 21. At S15, the operation apparatus 10 updates the coefficients set for the second neural network 22, based on the evaluation result of evaluating the error of the operation by the first neural network 21.

The operation apparatus 10 returns the process to S11 after completing S15. The operation apparatus 10 repeats the process from S11 to S15 during the first mode.

When the process proceeds to S16, the operation apparatus 10 is in a state where it is set to the second mode. At S16, the operation apparatus 10 determines whether the mode is switched. That is, the operation apparatus 10 determines whether it is switched to the first mode.

When the mode is not switched (No at S16), the operation apparatus 10 determines, at S17, whether a plurality of input values is acquired. When no input values are acquired (No at S17), the operation apparatus 10 returns the process to S16. When the input values are acquired (Yes at S17), the operation apparatus 10 advances the process to S18. When the mode is switched (Yes at S16), the operation apparatus 10 returns the process to S11.

At S18, the operation apparatus 10 performs the operation on the acquired input values by the second neural network 22. As a result, the operation apparatus 10 can output a plurality of output values. At S19, the operation apparatus 10 evaluates an error of the operation by the second neural network 22. At S20, the operation apparatus 10 updates the coefficients set for the first neural network 21, based on the evaluation result of evaluating the error of the operation by the second neural network 22.

The operation apparatus 10 returns the process to S16 after completing S20. The operation apparatus 10 repeats the process from S16 to S20 during the period of the second mode.

By the above process, the operation apparatus 10 can perform the operation by the first neural network 21 in the first mode and perform the operation by the second neural network 22 in the second mode. Furthermore, the operation apparatus 10 can update the coefficients set for the second neural network 22 in the first mode and update the coefficients set for the first neural network 21 in the second mode. Thus, the operation apparatus 10 can perform the operation process and the learning process in the neural network in parallel.

The operation apparatus 10 is switched between the first mode and the second mode alternately. This enables the operation apparatus 10 to advance the update of the coefficients set for the first neural network 21 and the update of the coefficients set for the second neural network 22 alternately. Thus, the operation apparatus 10 enables both the first neural network 21 and the second neural network 22 to be adaptive.

Figure 3:
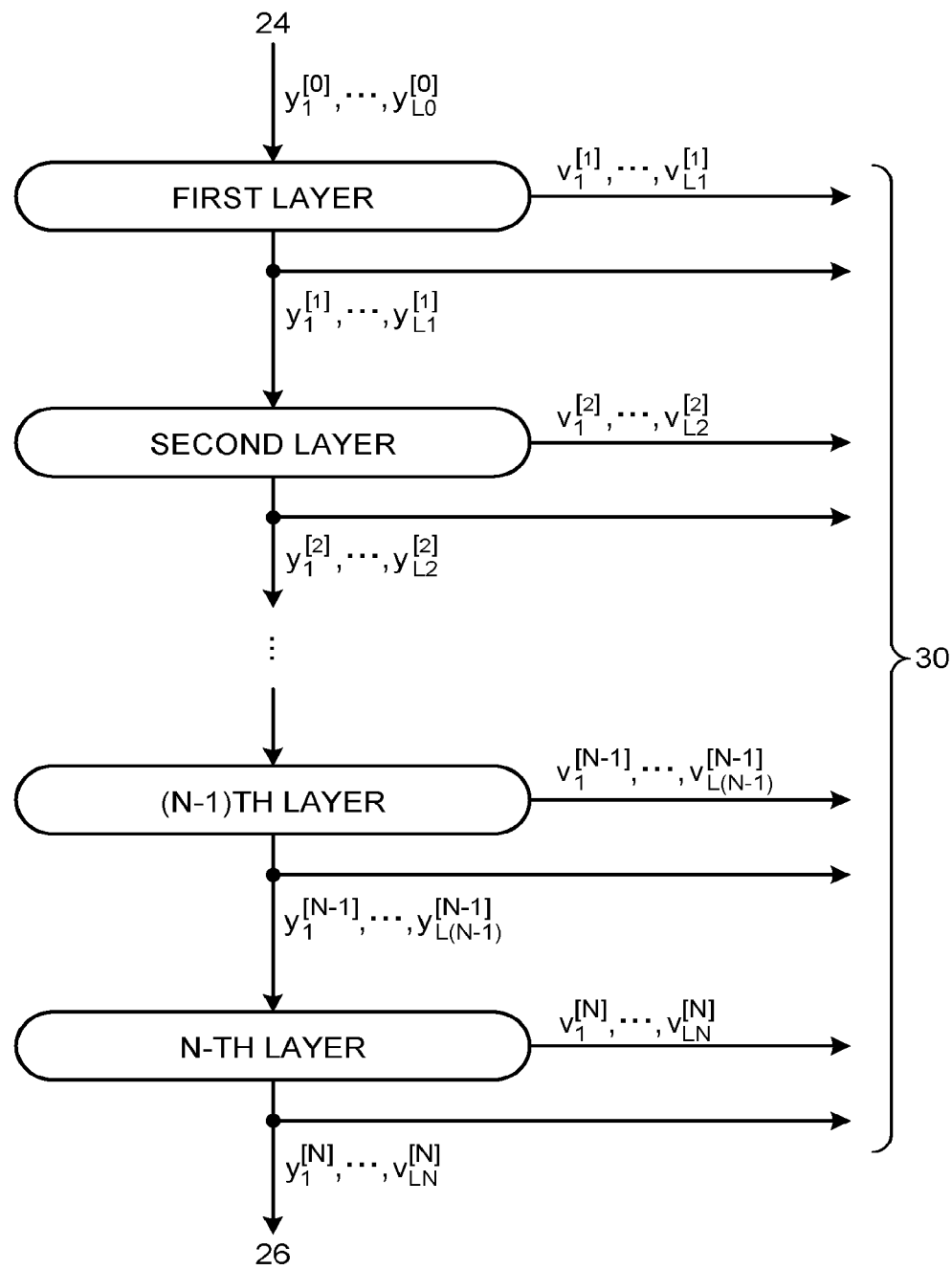
FIG. 3 is a structural diagram of first and second neural networks.

FIG. 3 is a diagram illustrating the configuration of the first neural network 21 and the second neural network 22. Each of the N layers from the first layer to the N-th layer of the first neural network 21 and the second neural network 22 performs the following process.

The first layer acquires input values from the input unit 24. An x-th (x is an integer of 1 or more) input value of the input values is represented by $y^{[0]}_x$.

Note that a superscript number in the square brackets of y denotes a layer number. [0] denotes the number of the input unit 24. A subscript number of y denotes the order of a plurality of values input to or output from the layer. The same goes for other variables.

Each of the N layers outputs the intermediate output values to the subsequent layer. The number of intermediate output values output from each of the N layers may be different from each other. An x-th intermediate output value of the intermediate output values output from an n-th layer is represented by $y^{[n]}_x$, where n is any integer from 1 to N.

Each of the second to N-th layers acquires the intermediate output values from the preceding layer. Note that the number of intermediate output values acquired by each of the second to N-th layers is the same as the number of intermediate output values output from the preceding layer.

Each of the N layers calculates a plurality of product-sum operation values by matrix-multiplying the intermediate output values output from the preceding layer by the set coefficients. An x-th product-sum operation value of the product-sum operation values calculated at the n-th layer is represented by $v^{[n]}_x$.

In addition, each of the N layers calculates the intermediate output values by performing a preset activation-function operation on the product-sum operation values. Each of the N layers outputs the calculated intermediate output values. The activation function set for each of the N layers may be different from that of any other layer.

The N-th layer outputs the intermediate output values to the output unit 26. The output unit 26 provides the intermediate output values output from the N-th layer for another device, as a plurality of output values output from the operation apparatus 10.

Each of the N layers outputs the calculated product-sum operation values and intermediate output values to the coefficient-updating unit 30 for it to update the coefficients. The number of product-sum operation values output from each of the N layers is the same as the number of intermediate output values.

Figure 4:
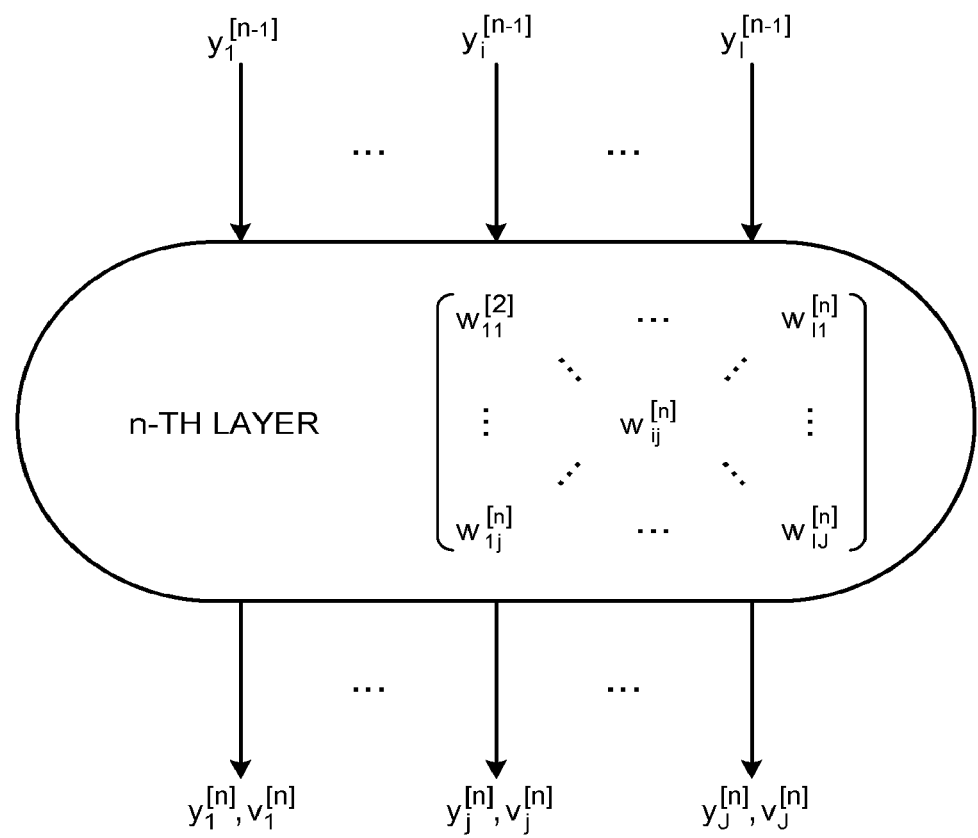
FIG. 4 is a diagram indicating input and output values to/from an n-th layer of the first and second neural networks.

FIG. 4 is a diagram illustrating the input and output values to/from the n-th layer of the first neural network 21 and the second neural network 22, as well as the set coefficients. The n-th layer of the first neural network 21 and the second neural network 22 performs the following process.

The n-th layer acquires I intermediate output values output from the preceding (n−1)th layer, where I is an integer of 2 or more. Note that, if n=1, the n-th layer (i.e., the first layer) acquires I input values output from the input unit 24 as the I intermediate output values. An i-th (i is an integer of 1 or more and I or less) intermediate output value of the I intermediate output values acquired by the n-th layer is represented by $y^{[n-1]}_i$.

The n-th layer outputs J intermediate output values, where J is an integer of 2 or more. A j-th (j is an integer of 1 or more and J or less) intermediate output value of the J intermediate output values output from the n-th layer is represented by $y^{[n]}_j$.

(I×J) coefficients placed correspondingly to a matrix of I columns and J rows are set for the n-th layer. In the (I×J) coefficients set for the n-th layer, a coefficient placed at an i-th column and a j-th row is represented by $w^{[n]}_{ij}$.

The n-th layer outputs J product-sum operation values. A j-th product-sum operation value of the J product-sum operation values calculated by the n-th layer is represented by $v^{[n]}_j$.

In such a case, the n-th layer calculates the J product-sum operation value by using a matrix multiplication illustrated in the following equation (1), where j=1 to J.

$$v^{[n]}_j = \sum_{i=1}^{I} \left( w^{[n]}_{ij} \times y^{[n-1]}_i \right) \tag{1}$$

In addition, an activation function is set for the n-th layer. The activation function set for the n-th layer is represented by $f^{[n]}(\bullet)$.

The n-th layer calculates the J intermediate output values by using an activation-function operation illustrated in the following equation (2), where j=1 to J.

$$y^{[n]}_j = f^{[n]}(v^{[n]}_j) \tag{2}$$

The n-th layer outputs the J calculated intermediate output values to the (n+1)th layer. Note that, when n=N, the n-th layer (i.e., the N-th layer) provides the J calculated intermediate output values for the output unit 26.

The n-th layer outputs the calculated J product-sum operation values and J intermediate output values to the coefficient-updating unit 30 in order to update the coefficients.

Figure 5:
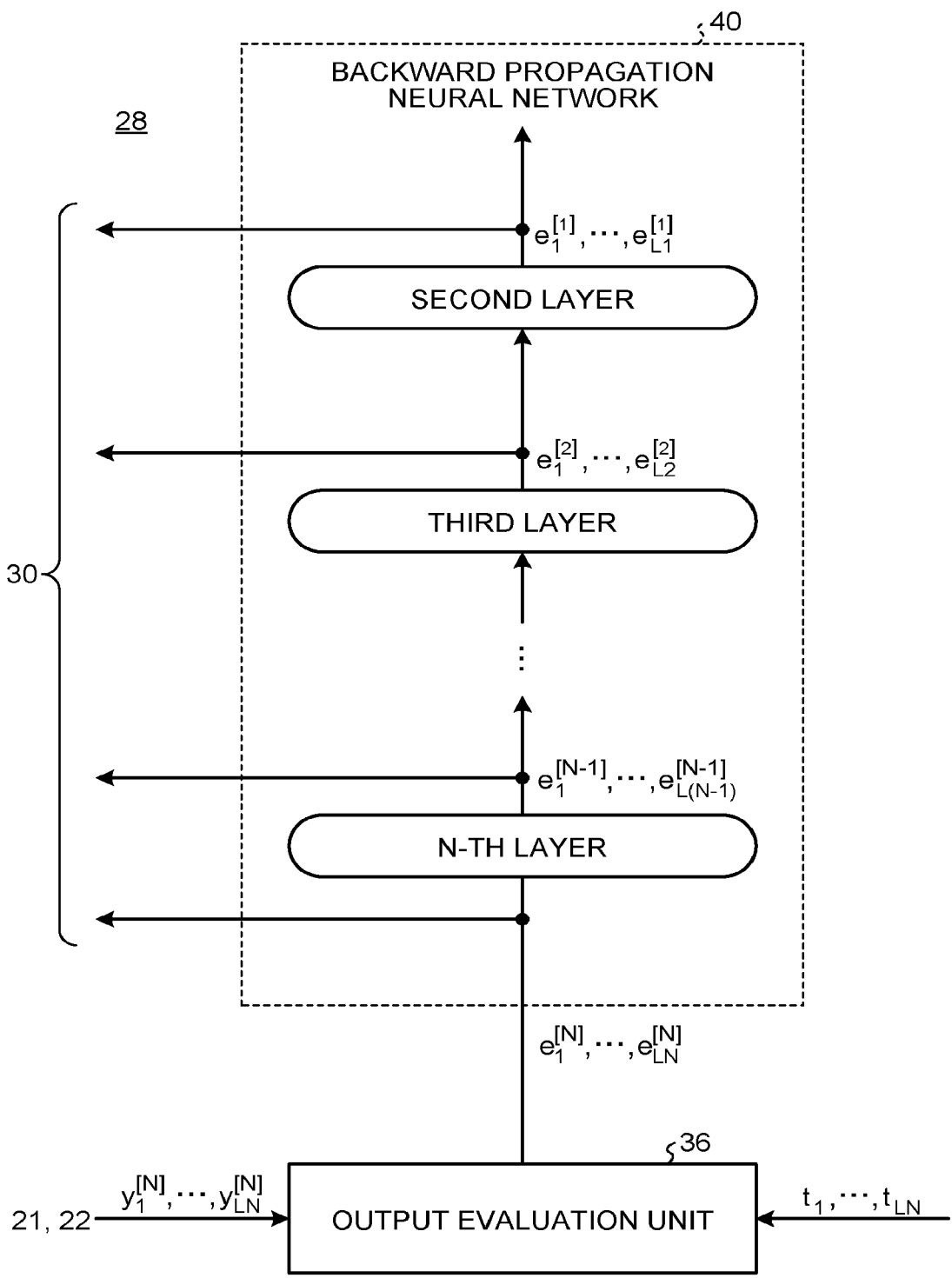
FIG. 5 is a structural diagram of an evaluation unit.

FIG. 5 is a diagram illustrating a configuration of the evaluation unit 28. The evaluation unit 28 includes an output evaluation unit (an output evaluation circuit) 36 and a backward propagation neural network 40.

The output evaluation unit 36 acquires, from another device, a plurality of target values, each being a target (teacher) of the corresponding output value output from the operation apparatus 10. An x-th target value of the target values is represented by $t_x$.

In the first mode, the output evaluation unit 36 acquires the intermediate output values output from the N-th layer of the first neural network 21. In the first mode, the output evaluation unit 36 evaluates an error for each of the intermediate output values output from the N-th layer of the first neural network 21 relative to each of the target values, and thereby generates a plurality of output evaluation values.

In the second mode, the output evaluation unit 36 acquires the intermediate output values output from the N-th layer of the second neural network 22. In the second mode, the output evaluation unit 36 evaluates an error for each of the intermediate output values output from the N-th layer of the second neural network 22 relative to each of the target values, and thereby generates the output evaluation values.

When the output evaluation unit 36 is implemented with a processor circuit, it may generate the output evaluation values by substituting the intermediate output values output from the N-th layer of the first neural network 21 or the second neural network 22 and the target values into a loss function prepared in advance. The output evaluation unit 36 may be provided with a hardware circuit that can perform a process corresponding to the loss function.

The output evaluation unit 36 provides the output evaluation values for the backward propagation neural network 40. An x-th output evaluation value of the output evaluation values is represented by $e^{[N]}_x$.

The backward propagation neural network 40 propagates the output evaluation values output from the output evaluation unit 36 and outputs a plurality of intermediate evaluation values corresponding to each of the N layers.

The backward propagation neural network 40 is a neural network implemented with a hardware circuit. In the backward propagation neural network 40, the coefficients set for each of the layers may be variable resistor elements used for resistive random access memories (ReRAMs), or may be variable capacitors, for example.

The backward propagation neural network 40 has (N−1) layers corresponding to the second to N-th layers of the first neural network 21 and the second neural network 22. The backward propagation neural network 40 propagates the output evaluation values received from the output evaluation unit 36 in a direction from the N-th layer toward the second layer.

The N-th layer acquires the output evaluation values from the output evaluation unit 36. An x-th output evaluation value of the output evaluation values is represented by $e^{[N]}_x$.

An m-th layer in the second to (N−1)th layers acquires the intermediate evaluation values from the preceding (m+1)th layer. An x-th intermediate evaluation value of the intermediate evaluation values output from the m-th layer is represented by $e^{[m]}_x$, where m is any integer of 2 to N.

Note that the number of intermediate evaluation values acquired by each of the (N−1) layers is the same as the number of intermediate output values output from the corresponding layer of the first neural network 21 and the second neural network 22.

The m-th layer of the (N−1) layers calculates a plurality of operation values by matrix-multiplying the intermediate evaluate values output from the preceding (m+1)th layer by the set coefficients.

Each of the (N−1) layers calculates the operation values by performing a matrix multiplication in which the matrix multiplication for the corresponding layer of the first neural network 21 and the second neural network 22 is transposed. The coefficients set for each of the (N−1) layers may be independent of the coefficients set for the corresponding layer of the first neural network 21 and the second neural network 22. For example, the coefficients set for each of the (N−1) layers of the backward propagation neural network 40 may be random values.

Furthermore, each of the (N−1) layers calculates the intermediate evaluation values by performing the preset function operation on the operation values. The function preset for each of the (N−1) layers may be independent of the activation function set for the corresponding layer of the first neural network 21 and the second neural network 22.

The backward propagation neural network 40 outputs the intermediate evaluation values calculated by each of the (N−1) layers to the coefficient-updating unit 30 as the intermediate evaluation values corresponding to the preceding layer of the first neural network 21 and the second neural network 22. That is, the backward propagation neural network 40 outputs the intermediate evaluation values calculated by the m-th layer as the intermediate evaluation values corresponding to the (m−1)th layer of the first neural network 21 and the second neural network 22.

Furthermore, the backward propagation neural network 40 outputs the output evaluation values acquired by the N-th layer as the intermediate evaluation values corresponding to the N-th layer of the first neural network 21 and the second neural network 22.

Figure 6:
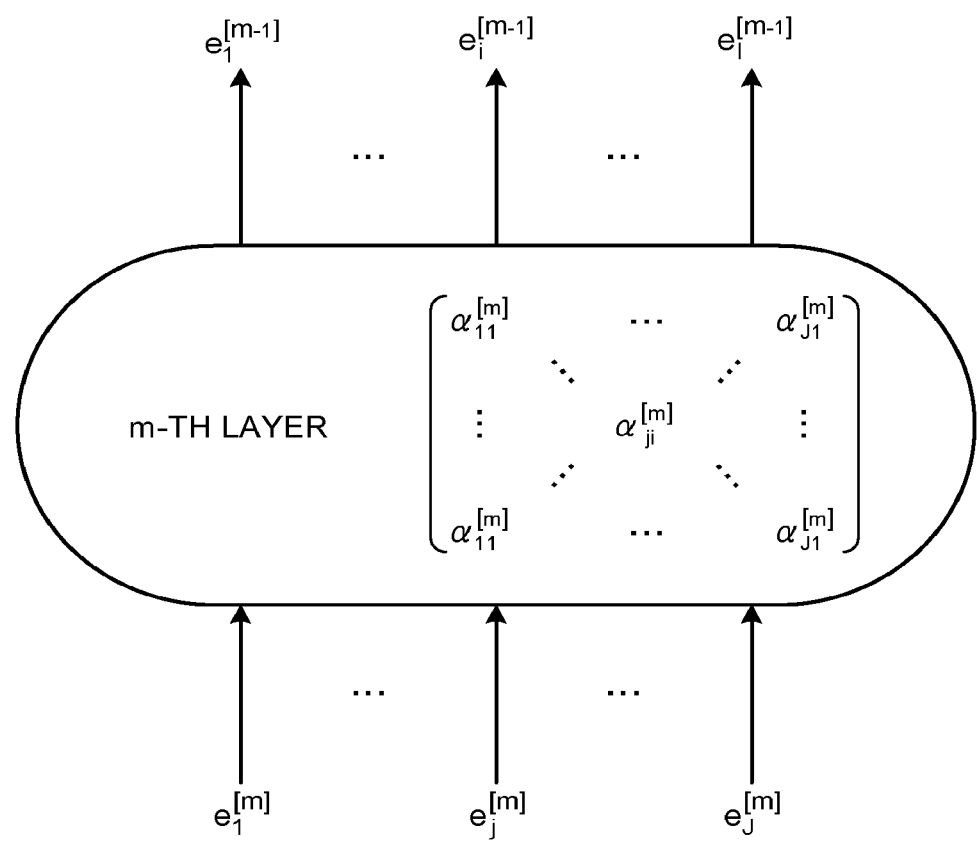
FIG. 6 is a diagram illustrating input and output values to/from an m-th layer of a backward propagation neural network.

FIG. 6 is a diagram illustrating input and output values to/from the m-th layer of the backward propagation neural network 40, as well as the set coefficients. The m-th layer of the backward propagation neural network 40 performs the following process.

The m-th layer acquires J output evaluation values output from the preceding (m+1)th layer. Note that, if m=N, the m-th layer (i.e., the N-th layer) acquires the J output evaluation values output from the output evaluation unit 36 as J intermediate evaluation values. A j-th intermediate evaluation value of the J intermediate evaluation values acquired by the m-th layer is represented by $e^{[m]}_j$.

The m-th layer outputs I intermediate evaluation values. An i-th intermediate evaluation value of the I intermediate evaluation values output from the m-th layer is represented by $e^{[m-1]}_i$.

(J×I) coefficients placed correspondingly to a matrix of J columns and I rows are set for the m-th layer. Of the (J×I) coefficients set for the m-th layer, a coefficient placed at a j-th column and an i-th row is represented by $\alpha^{[m]}_{ji}$.

The m-th layer calculates I operation values. An i-th operation value of the I operation values calculated by the m-th layer is represented by $s^{[m-1]}_i$.

In such a case, the m-th layer calculates the I operation values by using a matrix multiplication illustrated in the following equation (3), where i=1 to I.

$$s^{[m-1]}_i = \sum_{j=1}^{J}\left(\alpha^{[m]}_{ji} \times e^{[m]}_j\right) \quad (3)$$

Here, the matrix multiplication in the equation (3) is a matrix multiplication in which the matrix multiplication for the m-th layer of the first neural network 21 and the second neural network 22 is transposed.

In addition, an activation function is set for the m-th layer. The activation function set for the m-th layer is represented by $g^{[m]}(\bullet)$. In such a case, the m-th layer calculates the I intermediate evaluation values by using a function operation illustrated in the following equation (4), where i=1 to I.

$$e^{[m-1]}_i = g^{[m]}(s^{[m-1]}_i) \quad (4)$$

The m-th layer outputs the I calculated intermediate evaluation values to the subsequent (m−1)th layer of the backward propagation neural network 40. Note that, for m=2, the m layer (i.e., the second layer) does not output the I intermediate evaluation values to the subsequent layer.

Furthermore, the m-th layer outputs the I calculated intermediate evaluation values to the coefficient-updating unit 30 as the intermediate evaluation values corresponding to the (m−1)th layer of the first neural network 21 and the second neural network 22.

Figure 7:
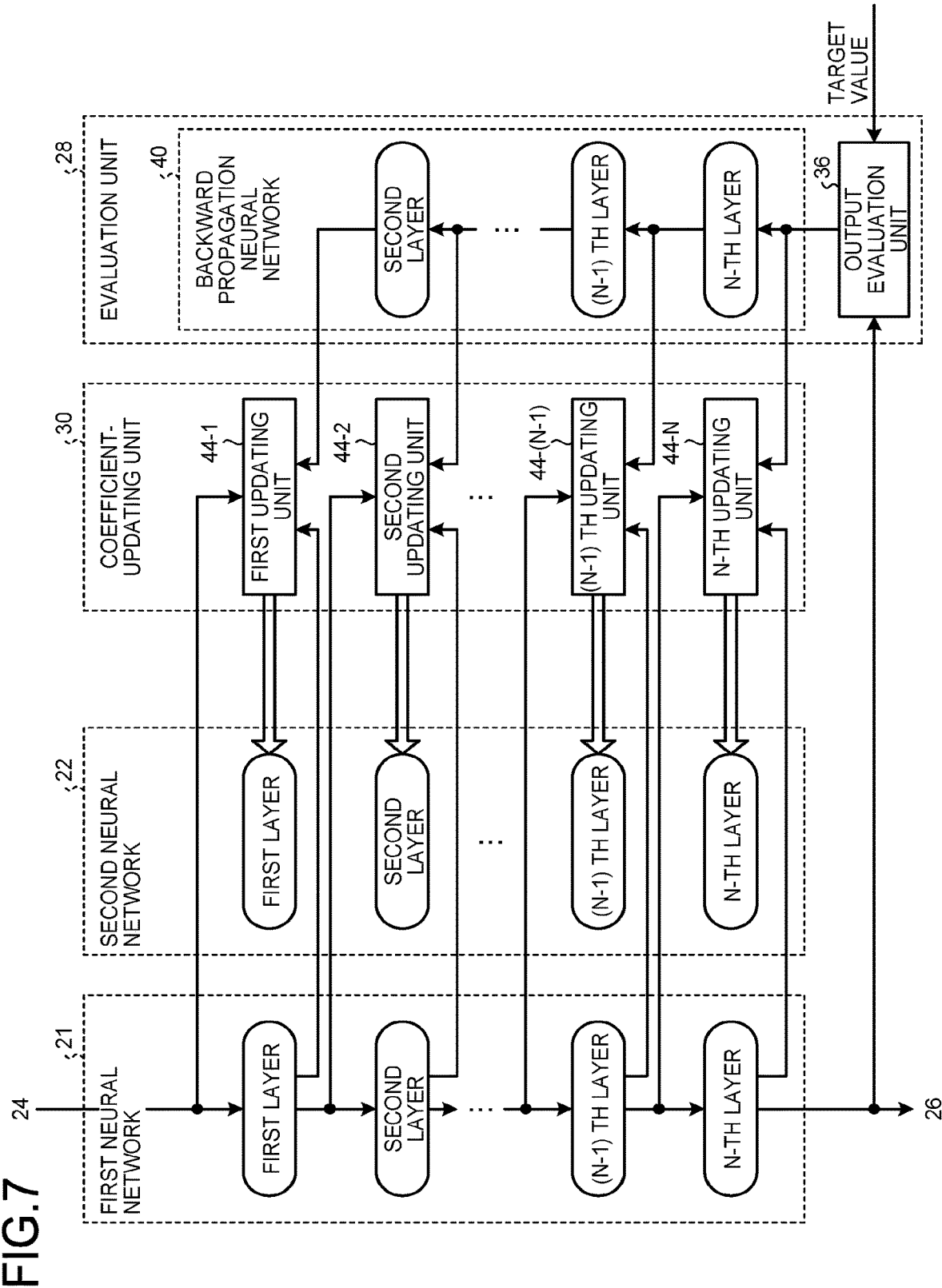
FIG. 7 is a diagram illustrating a signal input-output relation in a first mode.

FIG. 7 is a diagram illustrating a signal input-output relation within the operation apparatus 10 in the first mode. In the present embodiment, the coefficient-updating unit 30 has N, first to N-th, updating units 44-1 to 44-N.

In the first mode, the coefficient-updating unit 30 acquires the intermediate output values output from the preceding layer of the first neural network 21, correspondingly to each of the N, first to N-th, layers. For example, in the first mode, the n-th updating unit 44-n acquires the intermediate output values output from the (n−1)th layer of the first neural network 21.

Note that, in the first mode, the coefficient-updating unit 30 acquires the input values output from the input unit 24 as the intermediate output values corresponding to the first (initial) layer. Specifically, in the first mode, if n=1, the n updating unit 44-n (i.e., the first updating unit 44-1) acquires the input values output from the input unit 24 as the intermediate output values.

In the first mode, the coefficient-updating unit 30 acquires the product-sum operation values calculated by the corresponding layer of the first neural network 21, correspondingly to each of the N layers. For example, in the first mode, the n-th updating unit 44-n acquires the product-sum operation values calculated by the n-th layer of the first neural network 21.

In the first mode, the coefficient-updating unit 30 acquires, from the evaluation unit 28, the intermediate evaluation values calculated for the corresponding layer, correspondingly to each of the N layers. Specifically, in the first mode, the n-th updating unit 44-n acquires the intermediate evaluation values output from the (n−1)th layer of the backward propagation neural network 40. Note that, in the first mode, if n=N, the n-th updating unit 44-n (i.e., the N-th updating unit 44-N) acquires the intermediate evaluation values output from the output evaluation unit 36 as the intermediate evaluation values.

In the first mode, the coefficient-updating unit 30 updates the coefficients set for each of the N layers of the second neural network 22, based on the intermediate output values, the product-sum operation values and the intermediate evaluation values acquired correspondingly to each of the N layers. Specifically, the n-th updating unit 44-n updates the coefficients set for the n-th layer of the second neural network 22, based on the intermediate output values, the product-sum operation values and the intermediate evaluation values acquired correspondingly to the n-th layer.

Figure 8:
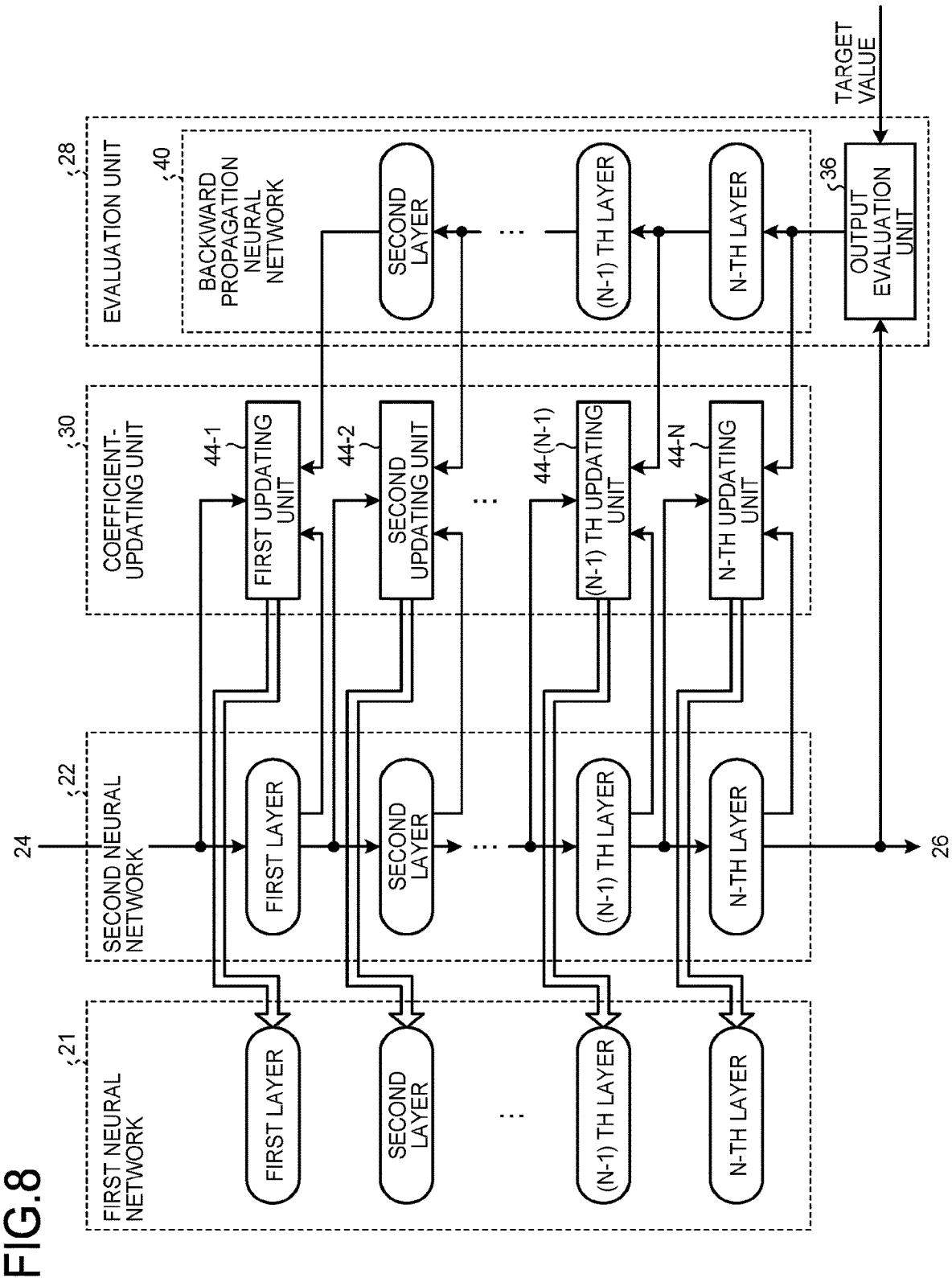
FIG. 8 is a diagram illustrating a signal input-output relation in a second mode.

FIG. 8 is a diagram illustrating a signal input-output relation within the operation apparatus 10 in the second mode.

In the second mode, the coefficient-updating unit 30 acquires the intermediate output values output from the preceding layer of the second neural network 22, correspondingly to each of the N, first to N-th, layers. Specifically, in the second mode, the n-th updating unit 44-n acquires the intermediate output values output from the (n−1)th layer of the second neural network 22.

Note that, in the second mode, the coefficient-updating unit 30 acquires the input values output from the input unit 24 as the intermediate output values corresponding to the first layer. For example, in the second mode, if n=1, the n-th updating unit 44-n (i.e., the first updating unit 44-1) acquires the input values output from the input unit 24 as the intermediate output values.

In the second mode, the coefficient-updating unit 30 acquires, correspondingly to each of the N layers, the product-sum operation values calculated by the corresponding layer of the second neural network 22. Specifically, in the second mode, the n-th updating unit 44-n acquires the product-sum operation values calculated by the n-th layer of the second neural network 22.

In the second mode, the coefficient-updating unit 30 acquires, correspondingly to each of the N layers, the intermediate evaluation values calculated for the corresponding layer from the evaluation unit 28. Specifically, in the second mode, the n-th updating unit 44-n acquires the intermediate evaluation values output from the (n−1)th layer of the backward propagation neural network 40. Note that, in the second mode, if n=N, the n-th updating unit 44-n (i.e., the N-th updating unit 44-N) acquires the intermediate evaluation values output from the output evaluation unit 36 as the intermediate evaluation values.

In the second mode, the coefficient-updating unit 30 updates the coefficients set for each of the N layers of the first neural network 21, based on the intermediate output values, the product-sum operation values and the intermediate evaluation values acquired correspondingly to each of the N layers. Specifically, the n-th updating unit 44-n updates the coefficients set for the n-th layer of the first neural network 21, based on the intermediate output values, the product-sum operation values, and the intermediate evaluation values acquired correspondingly to the n-th layer.

Figure 9:
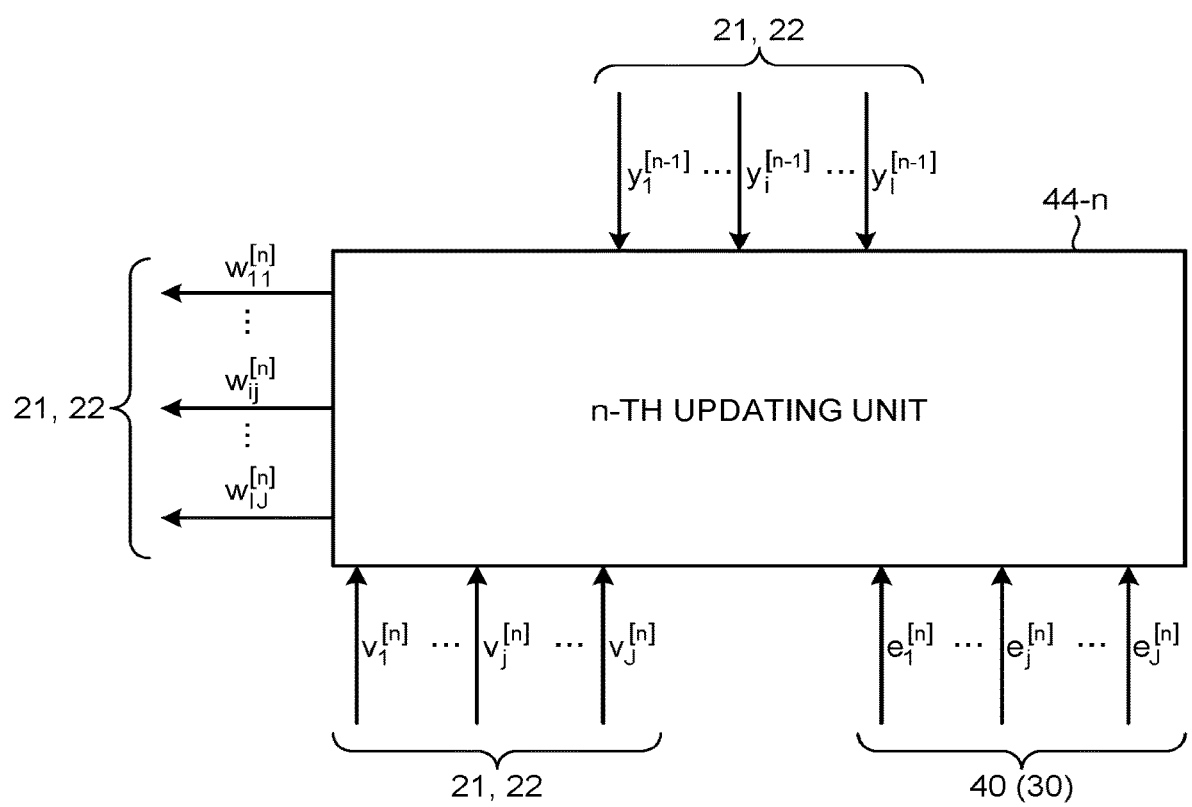
FIG. 9 is a diagram illustrating input and output values to/from an n-th updating unit.

FIG. 9 is a diagram illustrating input and output values to/from the n-th updating unit 44-n. The n-th updating unit 44-n carries out the following process.

The n-th updating unit 44-n acquires the I intermediate output values $y^{[n-1]}_1, \ldots, y^{[n-1]}_i, \ldots, y^{[n-1]}_I$. The n-th updating unit 44-n acquires the J product-sum operation values $v^{[n]}_1, \ldots, v^{[n]}_j, \ldots v^{[n]}_J$. The n-th updating unit 44-n acquires the J intermediate evaluation values ($e^{[n]}_1, \ldots, e^{[n]}_j, \ldots, e^{[n]}_J$).

The n-th updating unit 44-n updates the (I×J) coefficients ($w^{[n]}_{11}, \ldots w^{[n]}_{ij}, \ldots, w^{[n]}_{IJ}$) set for the n-th layer of the first neural network 21 and the second neural network 22. In the present embodiment, the n-th updating unit 44-n calculates the gradient of an evaluation function for evaluating an error of a coefficient, for each of the (I×J) coefficients set for the n-th layer. The n-th updating unit 44-n changes each of the (I×J) coefficients set for the n-th layer such that the gradient is reduced (for example, such that it becomes 0).

For example, among the (I×J) coefficients set for the n-th layer, a coefficient at an i-th row and a j-th column is represented by $w^{[n]}$. In this case, the n-th updating unit 44-n changes the coefficient of the i-th row and j-th column in accordance with the following equation (5). Note that, E denotes the evaluation function, and $\partial E/\partial w^{[n]}_{ij}$ denotes the gradient of the evaluation function for the coefficient of the i-th row and j-th column.

$$w^{[n]}_{ij} = w^{[n]}_{ij} - \partial E/\partial w^{[n]}_{ij} \qquad (5)$$

The n-th updating unit 44-n calculates the gradient ($\partial E/\partial w^{[n]}_{ij}$) by using the following equation (6), $$\partial E/\partial w^{[n]}_{ij} = y^{[n-1]}_i \times f^{[n]\prime}(v^{[n]}_j) \times e^{[n]}_j \qquad (6)$$

where $f^{[n]\prime}(\bullet)$ is the differential function of the activation function set for the n-th layer of the first neural network 21 and the second neural network 22.

The n-th updating unit 44-n is able to perform an operation corresponding to the error backward propagation method to update the coefficients set for the n-th layer of the first neural network 21 and the second neural network 22.

Figure 10:
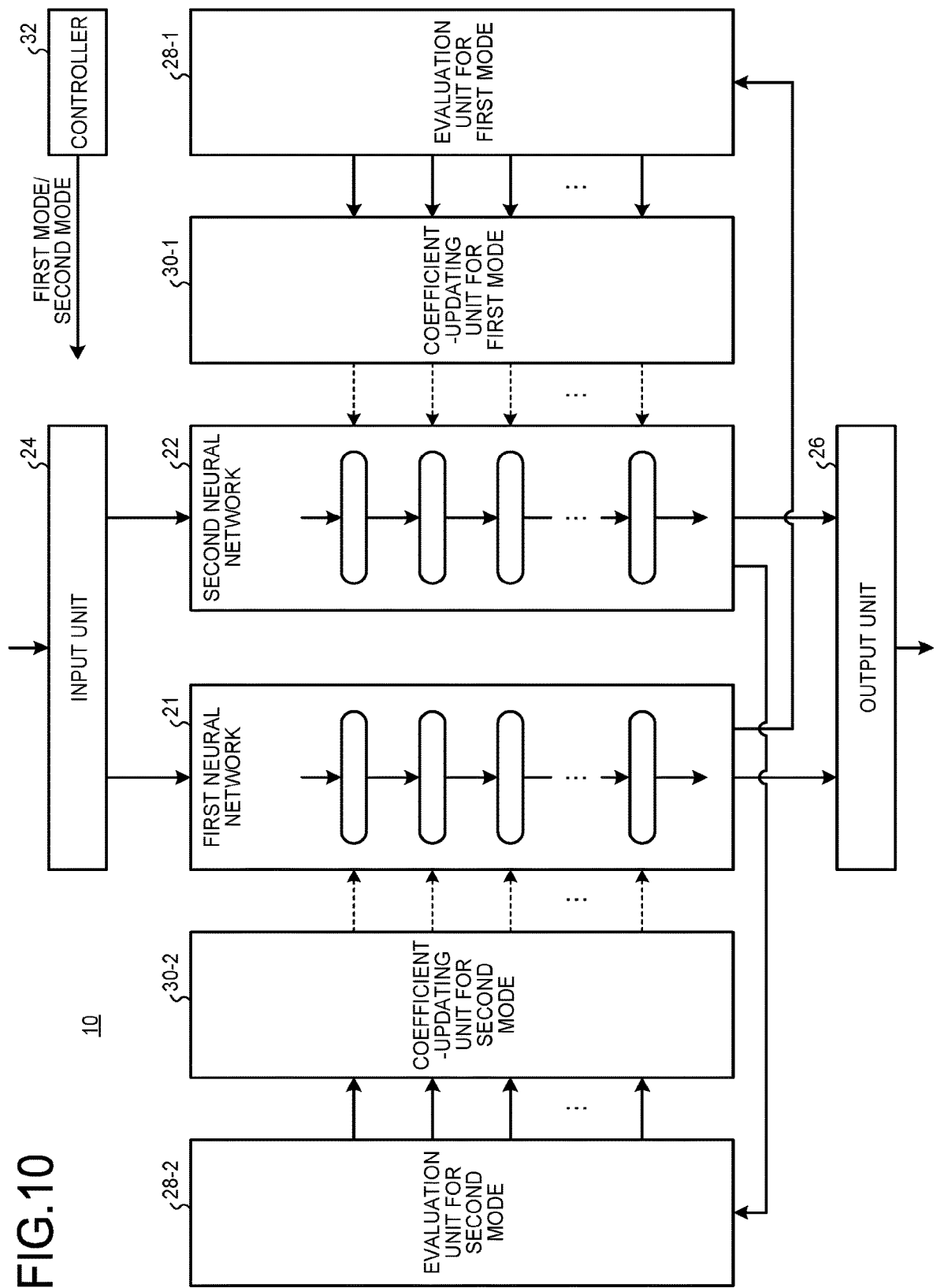
FIG. 10 is a structural diagram of an alternative embodiment of the operation apparatus.

FIG. 10 is a structural diagram of an alternative embodiment of the operation apparatus 10. In place of the evaluation unit 28 and the coefficient-updating unit 30, the operation apparatus 10 may include an evaluation unit 28-1 for the first mode, an evaluation unit 28-2 for the second mode, a coefficient-updating unit 30-1 for the first mode, and a coefficient-updating unit 30-2 for the second mode.

The evaluation unit 28-1 for the first mode and the evaluation unit 28-2 for the second mode have the same configuration as that of the evaluation unit 28 illustrated in FIG. 1. The coefficient-updating unit 30-1 for the first mode and the coefficient-updating unit 30-2 for the second mode have the same configuration as that of the coefficient-updating unit 30 illustrated in FIG. 1.

In the first mode, the controller 32 activates the evaluation unit 28-1 and coefficient-updating unit 30-1 for the first mode and halts the action of the evaluation unit 28-2 and coefficient-updating unit 30-2 for the second mode. In the second mode, the controller 32 halts the action of the evaluation unit 28-1 and coefficient-updating unit 30-1 for the first mode and activates the evaluation unit 28-2 and coefficient-updating unit 30-2 for the second mode.

Such a structure of the operation apparatus 10 allows the coefficient-updating unit 30-2 for the second mode to be placed close to the first neural network 21. Similarly, the operation apparatus 10 allows the coefficient-updating unit 30-1 for the first mode to be placed close to the second neural network 22. Those placements in the operation apparatus allow any physical switches and other devices to be eliminated, and wires or other components for updating coefficients to be reduced.

As described above, the operation apparatus 10 is able to perform the operation process by the neural network and the learning process in the neural network in parallel. This enables the operation apparatus 10 to perform the learning process in real time without halting the operation process.

In addition, the operation apparatus 10 generates the intermediate evaluation values for learning coefficients set for each of the layers of the neural network, by using the backward propagation neural network 40. The operation apparatus 10 produces the following effect by using the backward propagation neural network 40.

In implementation of the neural network with hardware, coefficients are implemented with, for example, resistance values or capacitor capacitances. Such an implementation of the neural network with hardware may cause a learning device to spend relatively long time to update the coefficients.

In a conventional error backward propagation method, when updating coefficients of one layer, a learning device must have been finished updating coefficients of the immediately preceding layer. Thus, when coefficients of the hardware-implemented neural network are updated by using the conventional error backward propagation method, the learning device requires extremely long time to update the coefficients for every layers of the neural network.

In contrast, the operation apparatus 10 according to the present disclosure calculates the intermediate evaluation values for each of the layers by using the backward propagation neural network 40. Thus, the operation apparatus 10 can calculate the intermediate evaluation values for each of the layers without updating the coefficients of the targeted neural network. This enables the operation apparatus 10 to rapidly perform the learning process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An operation apparatus, comprising:
a first neural network configured to perform an operation in a first mode, the first neural network being implemented with a hardware circuit;
a second neural network configured to perform an operation in a second mode differing from the first mode, the second neural network being implemented with a hardware circuit and having a same layer structure as a layer structure of the first neural network;
an evaluation circuit configured to evaluate an error of the operation performed by the first neural network in the first mode and evaluate an error of the operation performed by the second neural network in the second mode; and
a coefficient-updating circuit configured to
update, in the first mode, a plurality of coefficients set for the second neural network based on an evaluating result of the error of the operation of the first neural network, and
update, in the second mode, a plurality of coefficients set for the first neural network based on an evaluating result of the error of the operation of the second neural network, wherein
the first neural network and the second neural network have N (N is an integer of two or more) layers, respectively,
the first neural network and the second neural network individually output a plurality of intermediate output values from each of the corresponding N layers, and
the evaluation circuit is further configured to
generate, in the first mode, a plurality of intermediate evaluation values correspondingly to each of the N layers of the second neural network, the plurality of intermediate evaluation values being values obtained by evaluation the plurality of intermediate output values output from the corresponding layer of the N layers in the first neural network, and
generate, in the second mode, a plurality of intermediate evaluation values correspondingly to each of the N layers of the first neural network, the plurality of intermediate evaluation values being values obtained by evaluating the plurality of intermediate output values output from the corresponding layer of the N layers in the second neural network.

2. The apparatus according to claim 1, further comprising a control circuit configured to control alternate switching between the first mode and the second mode.

3. The apparatus according to claim 1, wherein the coefficient-updating circuit is further configured to
update, in the first mode, the coefficients set for each of the N layers of the second neural network based on the intermediate evaluation values corresponding to each of the N layers of the first neural network, and
update, in the second mode, the coefficients set for each of the N layers of the first neural network based on the intermediate output values corresponding to each of the N layers of the second neural network.

4. The apparatus according to claim 1, wherein each of the N layers of the first neural network and the second neural network calculates the intermediate output values by
calculating a plurality of product-sum operation values by matrix-multiplying the intermediate output values output from the preceding layer by the set coefficients, and
performing a preset activation-function operation on the product-sum operation values.

5. The apparatus according to claim 4, wherein the evaluation circuit includes:
an output evaluation circuit configured to
generate, in the first mode, a plurality of output evaluation values by evaluating an error for each of the intermediate output values output from an N-th layer of the first neural network relative to each of a plurality of target values, and generate, in the second mode, a plurality of output evaluation values by evaluating an error for each of the intermediate output values output from an N-th layer of the second neural network relative to each of the plurality of target values; and a backward propagation neural network configured to propagate the output evaluation values and output the intermediate evaluation values corresponding to each of the N layers.

6. The apparatus according to claim 5, wherein the backward propagation neural network has (N−1) layers corresponding to a second layer to the N-th layer of the first neural network and the second neural network, propagates the output evaluation values in a direction from the Nth layer toward the second layer, and calculates, for each of the (N−1) layers, the intermediate evaluation values by performing a matrix multiplication in which a matrix multiplication for a corresponding layer of the first neural network and the second neural network is transposed.

7. The apparatus according to claim 6, Wherein the backward propagation neural network outputs the intermediate evaluation values calculated by each of the (N−1) layers as the intermediate evaluation values corresponding to the preceding layer of the first neural network and the second neural network, and outputs the output evaluation values acquired by the N-th layer as the intermediate evaluation values corresponding to the N-th layer of the first neural network and the second neural network.

8. The apparatus according to claim 5, wherein, in the first mode, the coefficient-updating circuit is further configured to acquire the intermediate output values output from the preceding layer of the first neural network, the product-sum operation values calculated by the corresponding layer of the first neural network, and the intermediate evaluation values of the corresponding layer generated by the evaluation circuit, correspondingly to each of the N layers, and update the coefficients set for each of the N layers of the second neural network, based on the intermediate output values, the product-sum operation values and the intermediate evaluation values acquired correspondingly to each of the N layers, and in the second mode, the coefficient-updating circuit is further configured to acquire the intermediate output values output from the preceding layer of the second neural network, the product-sum operation values calculated by the corresponding layer of the second neural network, and the intermediate evaluation values of the corresponding layer generated by the evaluation circuit, correspondingly to the each of N layers, and update the coefficients set for each of the N layers of the first neural network, based on the intermediate output values, the product-sum operation values and the intermediate evaluation values acquired correspondingly to each of the N layers.

9. The apparatus according to claim 8, wherein, in the first neural network and the second neural network, an n-th layer (n is an integer of one or more and N or less) acquires I (I is an integer of two or more) intermediate output values output from the (n−1)th layer, the n-th layer outputs is an integer of two or more) intermediate output values, and (I×J) coefficients placed correspondingly to a matrix of I columns and J rows are set for the n-th layer.

10. The apparatus according to claim 9, wherein the n-th layer of the first neural network and the second neural network calculates J product-sum operation values by an equation (1) of a matrix multiplication, where j=I to J, $$v_j^{[n]} = \sum_{i=1}^{I} \left( w_{ij}^{[n]} \times y_i^{[n-1]} \right) \quad (1)$$

where $y^{[n-1]}_i$ denotes an i-th (i is an integer of 1 or more and I or less) intermediate output value acquired by the n-th layer of the first neural network and the second neural network, $v^{[n]}_j$ denotes a j-th (j is an integer of 1 or more and J or less) product-sum operation value calculated by the n-th layer of the first neural network and the second neural network, and $w^{[n]}_{ij}$ denotes a coefficient of an i-th column and a j-th row set for the n-th layer of the first neural network and the second neural network.

11. The apparatus according to claim 10; wherein the n-th layer of the first neural network and the second neural network calculates J intermediate output values by an equation (2) of an activation-function operation, where j=1 to J, $$Y^{[n]}_j = f^{[n]}(v^{[n]}_j) \quad (2)$$

where $y^{[n]}_j$ is a j-th intermediate output value out from the n-th layer of the first neural network and the second neural network, and $f^{[n]}(\bullet)$ is an activation function set for the n-th layer of the first neural network and the second neural network.

12. The apparatus according to claim 11, wherein the coefficient-updating circuit is further configured to update the coefficient of the i-th row and the j-th column set for the n-th layer of the first neural network and the second neural network based on $\partial E/\partial w^{[n]}_{ij}$ calculated by an equation (3), $$\partial E/\partial w^{[n]}_{ij} = y^{[n-1]}_i \times f^{[n]\prime}(v^{[n]}_j) \times e^{[n]}_j \quad (3)$$

where $e^{[n]}_j$ is a j-th intermediate evaluation value acquired by the n-th layer of the backward propagation neural network, $f^{[n]\prime}(\bullet)$ is a differential function of the activation function set for the n-th layer of the first neural network and the second neural network, E is an evaluation function for evaluating an error of a coefficient, and $\partial E/\partial w^{[n]}_{ij}$ is a gradient of the evaluation function for evaluating an error of a coefficient of an i-th row and a j-th column set for the n-th layer of the first neural network and the second neural network.

13. The apparatus according to claim 1, further comprising:

an input circuit configured to provide a plurality of input values for a first layer of the first neural network in the first mode and provide the input values for a first layer of the second neural network in the second mode; and an output circuit configured to output, as a plurality of output values, a plurality of values output from a final layer of the first neural network in the first mode and output, as the output values, a plurality of values output from a final layer of the second neural network in the second mode.

14. An operation apparatus according to claim 1, comprising:
a. first neural network configured to perform an operation in a first mode, the first neural network being implemented with a hardware circuit;
a second neural network configured to perform an operation in a second mode differing from the first mode, the second neural network being implemented, with a hardware circuit and having a same layer structure as a layer structure of the first neural network;
an evaluation circuit configured to evaluate an error of the operation performed by the first neural network in the first mode and evaluate an error of the operation performed by the second neural network in the second mode;
a coefficient-updating circuit configured to
update, in the first mode, a plurality of coefficients set for the second neural network based on an evaluating result of the error of the operation of the first neural network, and
update, in the second mode, a plurality of coefficients set for the first neural network based on an evaluating result of the error of the operation of the second neural network; and
a control circuit configured to control switching between the first mode and the second mode exclusively, wherein
the control circuit is further configured to
in the first mode, control the first neural network to perform the operation and control the evaluation circuit to evaluate the error, and control the second neural network not to perform the operation;
in the second mode, control the second neural network to perform the operation and control the evaluation circuit to evaluate the error, and control the first neural network not to perform the operation;
in the first mode, control the coefficient-updating circuit to update the plurality of coefficients set for the second neural network and not to update the plurality of coefficients set for the first neural network; and
in the second mode, control the coefficient-updating circuit to update the plurality of coefficients set for the first neural network and not to update the plurality of coefficients set for the second neural network.

15. The apparatus according to claim 14, wherein the control circuit is further configured to control alternate switching between the first mode and the second mode.

16. The apparatus according to claim 14, wherein
the first neural network and the second neural network have N (N is an integer of two or more) layers, respectively,
the first neural network and the second neural network individually output a plurality of intermediate output values from each of the corresponding N layers, and
the evaluation circuit is further configured to
generate, in the first mode, a plurality of intermediate evaluation values correspondingly to each of the N layers of the second neural network, the plurality of intermediate evaluation values being values obtained by evaluating the plurality of intermediate output values output from the corresponding layer of the N layers in the first neural network, and
generate, in the second mode, a plurality of intermediate evaluation values correspondingly to each of the N layers of the first neural network, the plurality of intermediate evaluation values being values obtained by evaluating the plurality of intermediate output values output from the corresponding layer of the N layers in the second neural network.

17. An operation apparatus comprising:
a first neural network configured to perform an operation in a first mode, the first neural network being implemented with a hardware circuit;
a second neural network configured to perform an operation in a second mode differing from the first mode, the second neural network being implemented with a hardware circuit and having a same layer structure as a layer structure of the first neural network;
an evaluation circuit configured to evaluate an error of the operation performed by the first neural network in the first mode and evaluate an error of the operation performed by the second neural network in the second mode;
a coefficient-updating circuit configured to
update, in the first mode, a plurality of coefficients set for the second neural network based on an evaluating result of the error of the operation of the first neural network, and
update, in the second mode a plurality of coefficients set for the first neural network based on an evaluating result of the error of the operation of the second neural network; and
a control circuit configured to control switching between the first mode and the second mode exclusively, wherein
the coefficient-updating circuit is further configured to
update, in the first mode, the plurality of coefficients set for the second neural network without using the evaluating result of the error of the operation of the second neural network; and
update, in the second mode, the plurality of coefficients set for the first neural network without using the evaluating result of the error of the operation of the first neural network.

18. The apparatus according to claim 17, wherein the control circuit is further configured to control alternate switching between the first mode and the second mode.

* * * * *